March 23, 1926.  A. CARRIER  1,577,560
ADVERTISING DEVICE
Filed Jan. 7, 1925   3 Sheets-Sheet 1
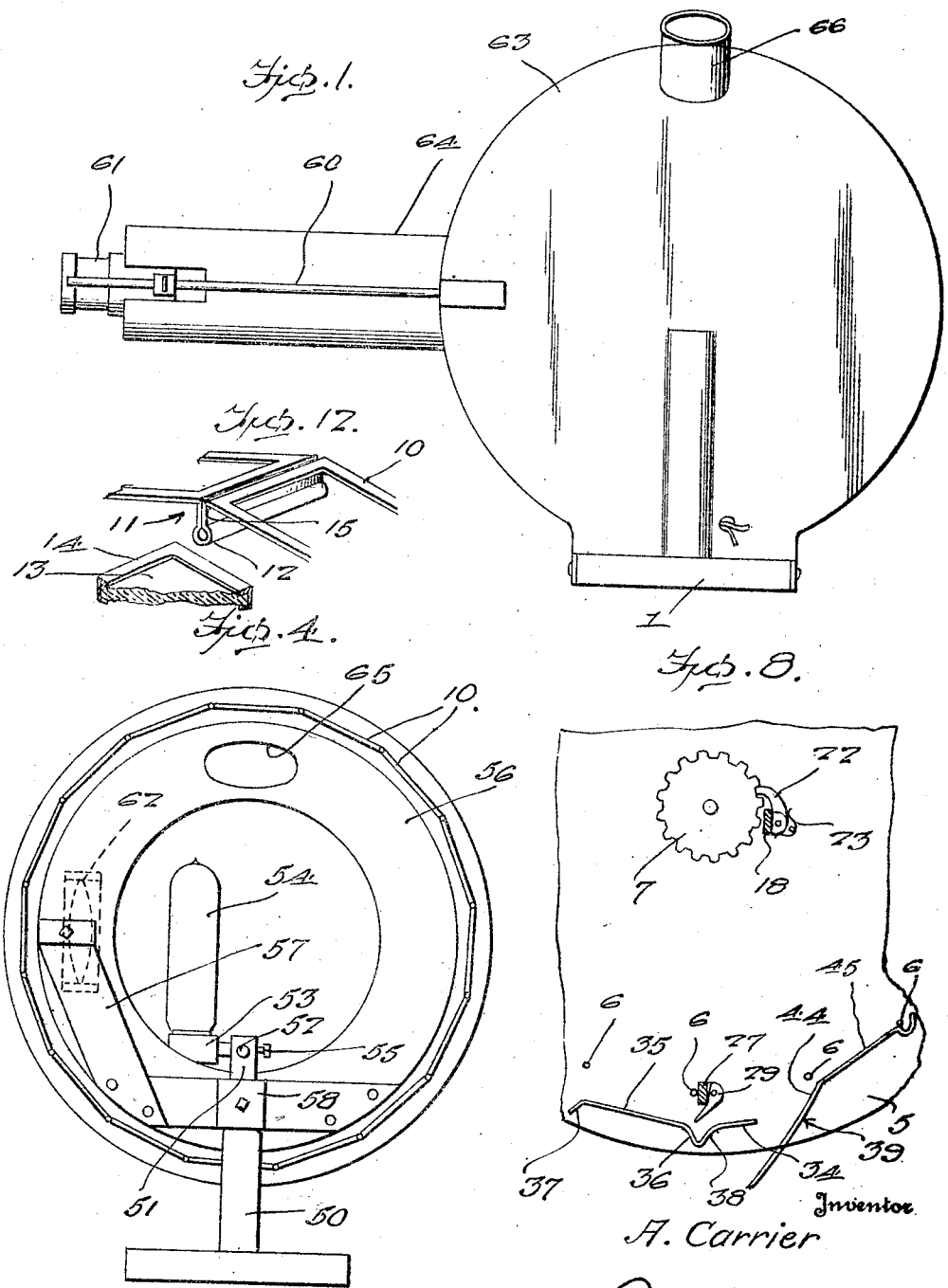
Inventor
A. Carrier

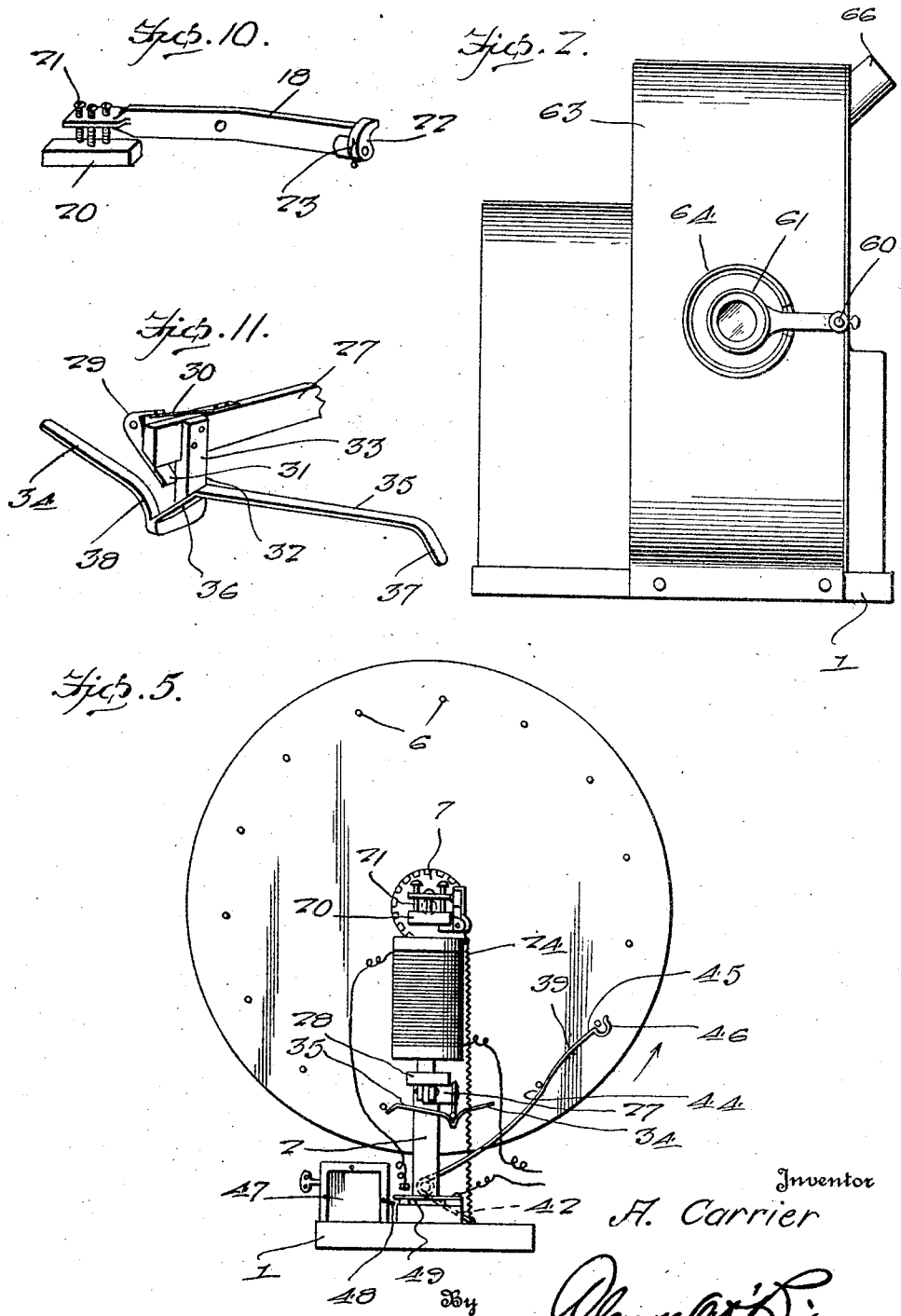

March 23, 1926.
A. CARRIER
ADVERTISING DEVICE
Filed Jan. 7, 1925
1,577,560
3 Sheets-Sheet 3
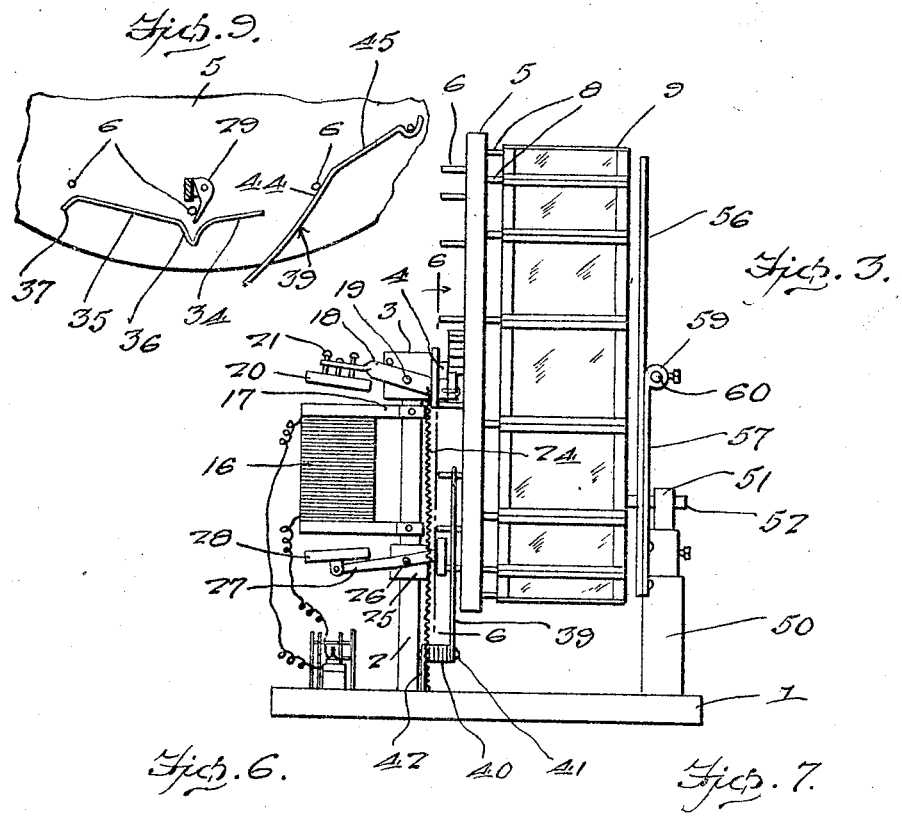
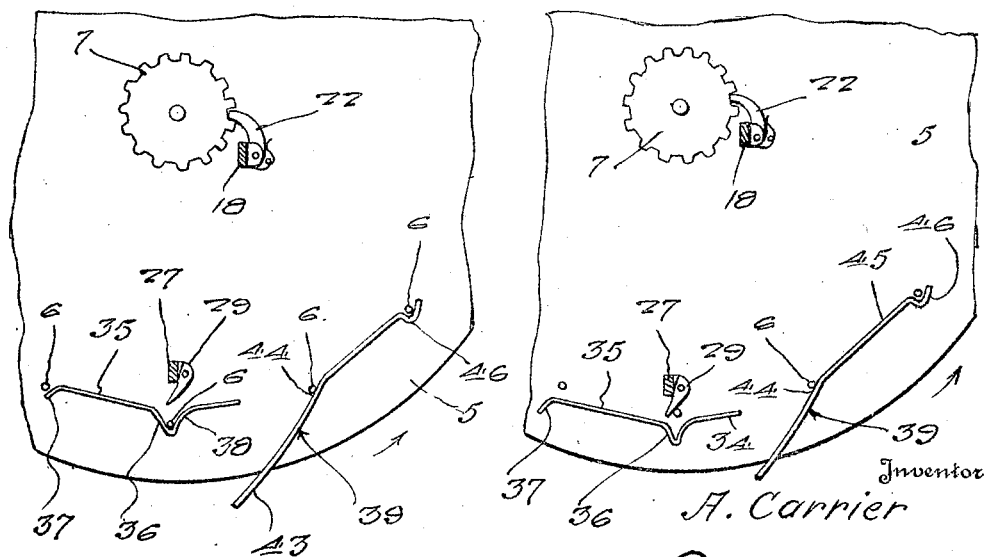
Inventor
A. Carrier
By
Attorney Patented Mar. 23, 1926.

1,577,560

UNITED STATES PATENT OFFICE.

ALSIME CARRIER, OF VAN BUREN, MAINE, ASSIGNOR OF ONE-EIGHTH TO J. B. PELLETIER, ONE-FOURTH TO EUGENE J. LEBRUN, ONE-FOURTH TO CYR R. VIOLETTE, AND ONE-FOURTH TO L. Y. VIOLETTE, ALL OF VAN BUREN, MAINE.

ADVERTISING DEVICE.

Application filed January 7, 1925. Serial No. 1,049.

*To all whom it may concern:*

Be it known that I, ALSIME CARRIER, a citizen of Canada, residing at Van Buren, in the county of Aroostook and State of Maine, have invented certain new and useful Improvements in Advertising Devices, of which the following is a specification.

This invention relates to improvements in advertising devices, and particularly to a device of this character, having a projector, and means for projecting the advertising matter on a plurality of plates carried by the device, on a suitable screen.

An object of the invention resides in providing an advertising device including a housing wherein a light projector is mounted, adapted to project focused light on a suitable screen, on which the advertisements are to be projected, and to provide means in the housing for mounting a plurality of removable advertising plates adapted to be successively positioned in the path of light projection, so that the advertisements thereon may be projected onto the screen, and means within the housing for operating the plate carrying device, to periodically position the successive plates so that the advertisements thereon may be projected on said screen.

A further object of the invention resides in providing a novel means for mounting a plurality of advertising plates, with a suitable means for periodically operating the carrying device for the plates to position them successively before a projector so that the advertisements thereon may be projected onto a suitable screen.

Another object of the invention resides in providing a suitable electrically operated means for rotating the carrier for advertising plates in a step-by-step movement periodically.

The invention comprehends other objects and improvements in the details of construction and arrangement of the parts in order to produce a simple advertising device, which may be manufactured at a relatively small cost, which are more particularly pointed out in the following detailed description, and in the claims directed to a preferred form of the invention, it being understood, however, that various modifications in the size, shape, and method of construction of the several parts may be made without departing from the spirit and scope of the invention as set forth herein.

In the drawings, forming a part of this application:

Figure 1 is a side elevation of the complete advertising device, forming the subject matter of this invention.

Figure 2 is an end elevation, taken from the left hand side of the device, as shown in Figure 1.

Figure 3 is a view, similar to Figure 2, with the housing removed.

Figure 4 is a view similar to Figure 1, with the housing removed.

Figure 5 is a view similar to Figure 4, showing the opposite side of the device.

Figure 6 shows a sectional view, taken on line 6—6 of Figure 3, with parts broken away, and illustrating particularly the position of the upper and lower operating levers, for the rotatable plate carrier, in the position of said carrier when the advertisement on the plate is being projected.

Figures 7, 8, and 9 illustrate views similar to Figure 6, showing the positions of the parts shown in Figure 6, during the actuation of these upper and lower operating arms for producing one step of movement of the plate carrier.

Figure 10 is a detail perspective view, on an enlarged scale, of the upper operating lever.

Figure 11 is a detail perspective view of the end portion of the lower operating lever, and Figure 12 is a detail perspective view of a portion of the frame member carried by the carrier disc, for removably supporting the advertiser plate in position, a portion of a frame holding one of said plates being also shown in its disassembled relation to the holder.

A base 1 carries all parts of the advertiser device, and is adapted to support the same on a suitable supporting surface in use, and on which is mounted an upright 2, carrying a block 3, at the upper end, in which is mounted a shaft 4, which rotatably mounts a carrier disc 5. The carrier disc 5 mounts a plurality of equally spaced pins 6 adjacent the periphery thereof and arranged in circumferential relation, concentric with the shaft 4, while the central portion of the disc 5 carries a suitable ratchet wheel 7, as illustrated in Figures 3 and 5. A plurality of supporting rods, indicated at 8, are mounted in spaced circumferential relation on the side of the carrier disc 5, opposite to that carrying the pins 6, and are adapted to receive a suitable plate holder 9. This plate holder is formed of a plurality of frame sections 10, joined at the ends and having the end portions formed as indicated at 11 in Figure 12, to provide bores 12, adapted to slidably fit on the supporting rods 8. The length of each frame 10 is equal substantially to the distance between a pair of supporting rods 8, so that an advertising plate 13 carried by a suitable frame 14 is adapted to be slidably positioned between each pair of rods 8, in one of the frames 10. The portions 11 of the frames 10 are formed to provide guides 15 for the ends of the frames 14 of the advertising plates, so that the same are removably held in the frames, in order that they may be positioned in the path of the light projector which will be presently described, so that the advertisements on the plates may be projected onto a suitable screen.

An electromagnet 16 is mounted by a suitable support 17, on the upright 2, and in spaced relation thereto, as shown in Figure 3. The upper end of this electromagnet is positioned slightly below the horizontal plane of the block 3, on the upper end of said upright. An upper operating lever 18 is pivotally mounted intermediate its ends at 19, on the block 3, as shown in Figure 3, with one end projecting over the upper end of the electromagnet 16 and provided with an armature 20, adjustably secured thereon by suitable screw members 21, shown particularly in Figure 10. In the operation of this lever 18, by the electromagnet, the adjustment of the screws 21 serves to determine the stroke of operation of the lever 18, for a purpose which will be presently described. The opposite end of this lever 18 which terminates adjacent the carrier disc 5, carries a pawl 22, which is pivotally mounted on the end portion of said lever, for movement in a plane transversely with respect to the plane of the lever, and which is adapted to engage the teeth of the ratchet wheel 7 for cooperation therewith, to effect the rotation of the carrier disc, in the operation of the lever 18 by the electromagnet 16. A spring 23 carried by the lever 18 engages the pawl 22 and normally holds the same in engagement with the ratchet wheel 7. A suitable coil spring 24 has one end connected to the lever 18, as illustrated in Figures 3 and 5, while the opposite end is secured to the base 1, so that when the electromagnet 16 is de-energized, the lever 18 will be normally held in the position shown in Figure 3, while the energization of the electromagnet will effect the rocking of the lever on the pivot 19, so that the armature 20 will be drawn toward said electromagnet. A block member 25 is mounted on the upright 2 below the electromagnet 16, as illustrated in Figure 3, and pivotally mounts, at 26, a lower operating lever 27. This lower operating lever is pivotally mounted on the block 25, intermediate its ends, as disclosed in Figure 3, one end projecting under the axis of the electromagnet 16 and being provided with an armature 28 adapted to be acted on by said electromagnet when the same is energized. The opposite end of the lever projects into close proximity with the side of the disc 5, and pivotally mounts, at one side of the end, a latch member 29, normally held at one limit of its movement by springs 30, carried by the upper edge of the lever 27, as illustrated in Figure 11. One end of this latch 29 projects below and beyond the opposite side of the lever 27 as illustrated at 31, for a purpose which will be presently described. A control member 32 is mounted on the end portion of the arm 27 and has a shank portion 33 which is connected with the arm 27 and projects downwardly therefrom as shown in Figure 11, the end portion being extended laterally and outwardly toward the end of the lever, terminating in a pair of arms 34 and 35 respectively, which are adapted to cooperate with the pins 6 on the disc 5, for controlling the rotative movement of said discs. The arm 35 is formed with inclined portions 36 and 37 respectively, the portion 36 being adjacent the connection of the arm with the shank portion 31, while the portion 37 is at the end of the arm. The arm 34 is provided with an inclined portion 38, adjacent the shank 31, inclined in a direction opposite to that of the inclined portion 36 of arm 35. This construction is clearly disclosed in Figure 11, and the purpose thereof will be presently described. A spring locking member 39 is provided with a coiled portion 40, mounted on a stud 41 carried by the upright 2, while one end portion 42 engages the base 1, for maintaining the spring tension of the coil 40, to force the arm 43 into engagement with the pins 6 on the disc 5. The end portion of the arm 43 of the spring locking member 39 is provided with an inclined portion 44 adapted to be engaged by one of the pins 6, so that a slight rotation of the disc 5 will move the end portion 45 of the arm extending between two of the pins 6 in the stationary position of the disc outwardly from between these pins. The end portion of the arm 43 is provided with a hook shaped extremity 46, which is adapted to engage around one of the pins 6 for effectively locking the disc against movement, when one of the advertising plates is in the proper position for projection by a suitable light projector carried by the device. The pin 6 engaging the portion 44 of the locking lever or member serves to aid in the disengagement of this hook 46 from the pin with which it engages when it is desired to move the disc 5, for positioning the next successive advertising plate, in the path of the light projector for projection of the advertising matter thereon.

A suitable clock work mechanism 47 of any desired construction is mounted on the base 1, and operates an alarm 48, which is adapted to periodically engage a suitable circuit closing device 49 mounted on the base 1, for interposing the electromagnet 16, in circuit with a suitable source of energy, so that the levers 18 and 27 will be operated for effecting the stepped rotation of the disc 5. In this way, the clockwork mechanism may be designed to operate the circuit closing mechanism every minute or half minute, so that the circuit is closed a sufficient length of time to permit the operation of the levers so that the disc is rotated one step, for moving a projection plate out of line with the projecting apparatus, and the next successive plate in line therewith, so that the advertising matter thereon may be projected on a suitable screen.

A standard 50 is mounted on the base 1, and it adjustably mounts a rod member 51, in the upper end thereof, as shown in Figure 3, which adjustably supports a rod 52, extending through an opening formed in the upper end of the rod 51, and which carries at the inner end thereof a lamp base 53 for a suitable electric lamp 54, adapted to provide a source of light for projecting the advertising matter on the plate mounted in the frame 10. The rod 52 extends within the circumference of the frame 10, as illustrated in Figure 4, and a bolt 55 serves to lock the rod 52 in adjusted position. An annular plate member 56 of a diameter smaller than the circumference of the frame 10, is mounted on a supporting bracket 57, which is provided at 58, with an enlarged portion fitting over the rod member 51, so that the bracket member and the annular plate 56 may be suitably mounted above the standard 50. The bracket member 57 is also formed with a holder 59, for a supporting rod 60, which is adjustably secured therein, and which projects forwardly in a horizontal plane with respect to the base from the disc 5 and the outer end portion thereof supports a suitable focusing lens structure 61. The annular plate member 56 carries a light condensing lens 62 thereon, which is positioned in line with the focusing lens member 61, and is positioned between the electric lamp 54, and the frame 10, carrying the plate 13.

A suitable housing 63 is secured to the base 1, for housing all of the above described structure within the same. This housing is provided with a cylindrical extension 64 arranged in axial relation with the plane of projection of the light from the lamp 54 by the condensing lens 62 and surrounds the focusing lens assembly 61, as shown in Figure 1 of the drawing. In this way, only the beam of light projecting the advertising matter is projected outwardly of the casing. The upper portion of the annular plate member 56 is provided with an opening 65, which registers with an inclined outlet 66 in the side wall of the casing 63 to permit the heat from the lamp 54 to escape outwardly from the casing, and prevent undue heating of the advertising plates and other advertising matter in the casing.

In the use of this invention, a screen is mounted at the point where the projection of the advertising matter is desired, so that it may be viewed by the public, and the invention above described is then positioned so that the light of the lamp 54 will be projected by the condensing lens 62 and the focusing lens 61, on the screen. The desired slide or advertising plate, bearing the advertising matter which it is desired to project onto the screen are slidably positioned into the frame 10, in the manner above described, and the focusing lens properly adjusted for focusing the advertising matter, so that it will appear clearly on the screen. The electromagnet 16 is connected in circuit, and the motor mechanism started for controlling the switch or circuit closer 49. Due to the operation of this motor mechanism 47, the circuit closer 49 will be periodically operated, to close the circuit through the electromagnet 16, for a predetermined length of time, which will energize said electromagnet, and cause the same to draw the armatures 20 and 28 toward the ends of the electromagnet. In this operation of the armatures by an electromagnet, a rocking movement of the members 18 and 27 will be effected, for producing the following described operation. Referring particularly to Figures 6, 7, 8 and 9, Figure 6 discloses the position of the levers while an advertising slide is being projected, and during the non-energization of the electromagnet 16. In this position, the pawl 22 on the lever 18 engages within one of the notches of the ratchet wheel 7, while the end of the lever 27 adjacent the disc 5 is positioned with one of the pins 6 seated in the notch formed by the inclined portions 36 and 38 of the arms on said control member, while another of said pins adjacent to the last mentioned pin, in the direction opposite that of rotation of the disc, is engaged against the inclined face 37 of the arm 35. This serves to hold the disc in a fixed position, during the projection of one of the advertising slides in the carrier, and with which the spring latch member 39 cooperates to hold said disc and prevent its rotation in one direction. This locking member 39 has the hooked end 46 positively retaining one of the pins 6 therein, and thereby effectively locking the disc against rotation in either direction, while the pin 6 adjacent the pin in the hook 46, in the direction opposite that of rotation of the disc 5 engages the inclined portion 44 of the spring locking member. At the time the electromagnet is initially energized, the operation of the lever 27 by the electromagnet causes the downward movement of the end of the arm adjacent the pin, which effects the engagement of the latch member 29 with the pin 6 between the inclined portions 36 and 38 of the control member, and causes the same to be pushed slightly away from the arm, in the direction of rotation, for imparting an initial rotative movement to the disc 5.

As this force is applied at the periphery of the disc, a substantial leverage is obtained, to start the movement of said disc so that the tension of the spring latch member 29 is overcome and through the operation of the pin 6 on the portion 44, the spring latch member is forced outwardly from the pin, against the tension of the coiled portion 40, so that the hook portion will be disengaged from the pin previously seated therein, while the pin 6, engaging the portion 44 will ride onto the portion 45 of the spring locking member. At this time, the downward pull of the magnet on the armature 20 will effect an upward pull on the pawl 22, which is in engagement with one of the notches of the ratchet wheel 7, and which will continue the rotative movement, moving slowly upwardly until the disc has rotated the distance between two of the pins 6. The progression of movement, above described, upon the energization of the electromagnet 16 is disposed in Figure 7, which shows the inclined portion of the latch member 29 in engagement with the pin 6, while the spring locking member 39 has been moved, so that the pin 6, formerly engaging the portion 44 has begun to ride over the portion 45 thereof. Figure 8 shows the position occupied by the upper and lower operating levers as one step of movement is completed, after the operation of parts, as shown in Figures 6 and 7, and just prior to the disconnection of the electromagnet from the source of energy by the motor means 47. As the parts reach the position shown in Figure 8, the motor mechanism operates to cut the current off to the electromagnet 16, which permits the parts to return to the position shown in Figure 6, but with the disc 5 moved the distance between two of the pins 6, the direction of rotation being indicated by the arrows in the several figures. The upper operating lever will move so that the end carrying the pawl 22 will move downwardly from the position shown in Figure 8, until the pawl 22 seats within the notch of the ratchet wheel next below the one in which it is engaged in this figure. The lower operating lever 27 will have the end cooperating with the pin 6, moved upwardly, so that as it moves upwardly, the latch members 29 will ride over the pin 6 as illustrated in Figure 9, and drop into the notch formed by the inclined portions of the control member, which are indicated at 36 and 38 respectively, until the control member has the bottom of this notch engaged with the pin 6. This pin is the one previously shown in engagement with the end portion 37 of the control member. In the movement past the latch member 29, the latch member will return to the position shown in Figure 6, through the action of the spring actuating the same, in order that upon the next upward movement of this end of the lever, the pin 6 will engage the inclined surface at the opposite side of the latch member, in order to start the rotation of the wheel in the direction of the arrow. As the pin 6 rides into the notch of the control member, as above described, from the position shown in Figure 9, the wheel reaches the proper set position for the projection of the next advertising slide and the spring locking member will engage with the next pair of pins 6, for locking the wheel against rotation as shown in Figure 6.

It will thus be seen that the novel operating device has been provided, which is simple in construction and efficient in operation, for rotating the disc 5, in step-by-step movement, in order to successively position the slides carried by the frames 10, in the proper position to be projected onto a desired screen.

What is claimed is:

1. An advertising device comprising a base, a standard mounted on the base, a disc member rotatably mounted on said standard, having means thereon for carrying a plurality of advertising plates, a pair of operating levers pivotally mounted on said standard in spaced relation, a ratchet wheel mounted on said disc, a pawl mounted on the end of one of said levers for engagement with said ratchet wheel, a plurality of spaced pins mounted in circumferential relation on said disc, means on the other lever adapted to cooperate with said pins, an electromagnet mounted on said standard between said levers and adapted when energized to move the levers on their pivots, for producing a cooperation of the pawl with the ratchet wheel, and the means on the other lever with said pins for effecting a stepped rotation of said disc, locking means for holding the disc in stationary position between the periods of operation of said levers to effect said stepped movement of the disc, whereby the periodic energization of said electromagnetic means will effect a periodic step-by-step movement of said disc whereby the advertisement on the advertising plate carried by the disc may be successively projected onto a suitable screen.

2. An advertising device comprising a rotatable member, a ratchet wheel fixed for rotation with the rotatable member, a pivotally mounted lever, a pawl on the lever for engagement with the ratchet wheel, a plurality of spaced pins mounted in circumferential relationship on the rotatable member about its axis, a second pivotally mounted lever, means on the second lever adapted to cooperate with the pins, an electromagnet mounted between said levers and adapted, when energized, to swing the levers for producing a cooperation of the pawl with the ratchet wheel and the means on the second lever with said pins for effecting a step by step rotation of the rotatable member.

3. An advertising device comprising a rotatable member, a ratchet wheel fixed for rotation with the rotatable member, a pivotally mounted lever, a pawl on the lever for engagement with the ratchet wheel, a plurality of spaced pins mounted in circumferential relationship on the rotatable member about its axis, a second pivotally mounted lever, means on the second lever adapted to cooperate with the pins, an electromagnet mounted between said levers and adapted, when energized, to swing the levers for producing a cooperation of the pawl with the ratchet wheel and the means on the second lever with said pins for effecting a step by step rotation of the rotatable member, and locking means for holding the rotatable member in stationary position between the periods of operation of said levers.

4. In an advertising device, a plate holder formed of a plurality of frame sections in an annular series, the portions of the frames between one another being bent over upon themselves and extended inwardly and radially having their innermost and intermediate portion curved to provide bores, a supporting member, rods extending from the supporting member and receivable in the bores, and plates receivable in the holder between the intermediate portions and registering with the frames.

In testimony whereof I affix my signature.

ALSIME CARRIER.